United States Patent
Showa et al.

(10) Patent No.: US 11,011,196 B2
(45) Date of Patent: May 18, 2021

(54) SPINDLE MOTOR AND HARD DISK DRIVE DEVICE

(71) Applicant: MINEBEA MITSUMI Inc., Nagano (JP)

(72) Inventors: Hideaki Showa, Kitasaku-gun (JP); Atsushi Yanagawa, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 17/004,085

(22) Filed: Aug. 27, 2020

(65) Prior Publication Data

US 2021/0065740 A1 Mar. 4, 2021

(30) Foreign Application Priority Data

Aug. 28, 2019 (JP) .............................. JP2019-155210

(51) Int. Cl.
| | |
|---|---|
| *G11B 5/55* | (2006.01) |
| *G11B 33/02* | (2006.01) |
| *G11B 5/72* | (2006.01) |
| *G11B 5/48* | (2006.01) |

(52) U.S. Cl.
CPC .......... *G11B 5/5569* (2013.01); *G11B 5/4826* (2013.01); *G11B 5/72* (2013.01); *G11B 33/027* (2013.01)

(58) Field of Classification Search
CPC ....... G11B 5/5569; G11B 5/4826; G11B 5/72; G11B 33/027
USPC .......................................................... 360/55
See application file for complete search history.

(56) References Cited

U.S. PATENT DOCUMENTS

| 9,886,984 | B2 | 2/2018 | Akagi et al. | |
|---|---|---|---|---|
| 10,068,622 | B2 | 9/2018 | Akagi et al. | |
| 10,460,768 | B2 | 10/2019 | Akagi et al. | |
| 2002/0047363 | A1* | 4/2002 | Kloeppel | H02K 5/225 |
| | | | | 310/71 |
| 2011/0239239 | A1* | 9/2011 | Yoon | G11B 7/22 |
| | | | | 720/697 |
| 2017/0186467 | A1 | 6/2017 | Akagi et al. | |
| 2018/0053534 | A1 | 2/2018 | Akagi et al. | |
| 2018/0308525 | A1 | 10/2018 | Kaneko et al. | |

(Continued)

FOREIGN PATENT DOCUMENTS

JP      2017-120676 A      7/2017

*Primary Examiner* — Allen T Cao
(74) *Attorney, Agent, or Firm* — Pearne & Gordon LLP

(57) ABSTRACT

A spindle motor includes a rotating part, a base member, a connector, and a connector accommodating recess in the base member. The connector accommodating recess includes a bottom surface and an annular wall surface extending from the bottom surface to the outer surface. A through-hole is formed in the bottom surface. The bottom surface includes a first annular surface extending toward the annular wall surface from a peripheral edge of the through-hole, and a second annular surface extending around the first annular surface on an axial outer surface side of the base member relatively to the first annular surface. The connector contacts the second annular surface. A first gap between the connector and the first annular surface is filled with an adhesive. An interface of the adhesive extends i to protrude from an inner peripheral surface of the through-hole over an entire circumference of the through-hole.

18 Claims, 9 Drawing Sheets

(56) References Cited

U.S. PATENT DOCUMENTS

2018/0308526 A1 10/2018 Kaneko et al.
2018/0322909 A1 11/2018 Kaneko et al.
2019/0013049 A1 1/2019 Akagi et al.

* cited by examiner

SPINDLE MOTOR AND HARD DISK DRIVE DEVICE

CROSS REFERENCE TO RELATED APPLICATIONS

This application claims the benefit of Japanese Patent Application No. 2019-155210, filed Aug. 28, 2019, which is hereby incorporated by reference in its entirety.

BACKGROUND

Technical Field

The present disclosure relates to a spindle motor and a hard disk drive device including a spindle motor.

Background

In a hard disk drive devices for driving a hard disk by a spindle motor, a low-density gas such as helium gas having a density lower than that of air may be enclosed in an internal space of a housing so as to increase the storage capacity. Such a hard disk drive device is provided with a connector for electrically connecting components disposed in the hard disk drive device with a circuit board provided outside the hard disk drive device. Further, in order to prevent leakage of the low-density gas from a through-hole in a connector accommodating recess formed in a base member forming a housing, a gap between the connector and the connector accommodating recess is sealed with an adhesive (for example, see Japanese Patent Application Laid-Open No. 2017-120676).

SUMMARY

The base member of the hard disk drive device in which a low-density gas, such as helium, is enclosed is required to have a high sealing performance. This is because, if the sealing performance for sealing the gap between the connector accommodating recess of the base member and the connector with the adhesive is insufficient, the low-density gas, such as helium, leaks from the gap between the connector accommodating recess and the connector to the outside of the hard disk drive device. On the other hand, in a case where the connector is accommodated in the connector accommodating recess, if an uncured adhesive protrudes from the gap between an outer peripheral surface of the connector and an annular wall surface of the connector accommodating recess, the protruding uncured adhesive may adhere to the outside of the base member during handling in a manufacturing process.

The present disclosure is related to providing a technique for preventing an uncured adhesive from protruding and adhering to an outside of a base member in a manufacturing process, while improving a sealing performance for sealing a gap between a connector accommodating recess provided in the base member and a connector with an adhesive.

A spindle motor that is applied to a hard disk drive device according to an aspect of the present disclosure includes a rotating part, a base member, a connector and a connector accommodating recess. The rotating part is configured to rotate about a central axis extending in an axial direction. The base member includes an inner surface and an outer surface, and the base member extends in a radial direction orthogonal to the axial direction and is configured to support the rotating part on an inner surface side of the base member. A component disposed on the inner surface side of the base member is electrically connected to the connector. The connector accommodating recess is formed on the outer surface of the base member. The connector accommodating recess includes a bottom surface extending in the radial direction, and an annular wall surface extending in the axial direction from an outer periphery of the bottom surface to the outer surface. A through-hole is formed in the axial direction in the bottom surface. The bottom surface includes a first annular surface extending toward the annular wall surface from a peripheral edge of the through-hole, and a second annular surface surrounding the first annular surface. In other words, the second annular surface extends around the first annular surface to the side of an outer surface portion extending in the axial direction. The connector contacts the second annular surface. A gap between the connector and the first annular surface is filled with an adhesive. An interface of the adhesive, when viewed along the axial direction, extends such that the interface protrudes from an inner peripheral surface of the through-hole over an entire circumference of the through-hole.

A hard disk drive device and a spindle motor according to the present disclosure are capable of preventing an uncured adhesive from leaking and adhering to an outside of a base member in a manufacturing process, while improving a sealing performance for sealing a gap between a connector accommodating recess provided in the base member and a connector with an adhesive.

DETAILED DESCRIPTION

Hereinafter, an embodiment of the present disclosure will be described with reference to the drawings.

Figure 1:
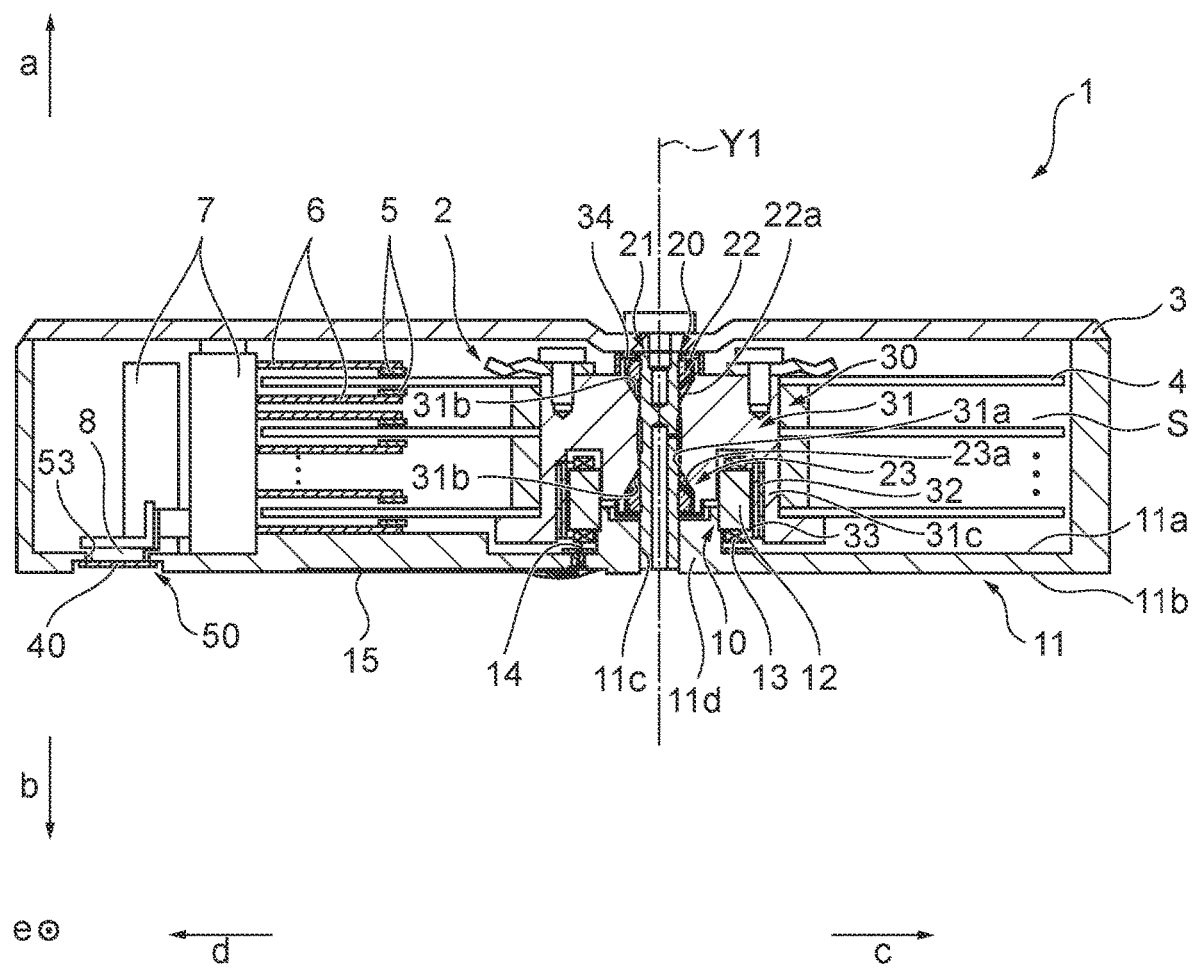
FIG. 1 is a sectional view of a hard disk drive device including a spindle motor according to an embodiment of the present disclosure.

FIG. 1 is a sectional view illustrating a schematic configuration of a hard disk drive device 1 including a spindle motor 2 according to an embodiment of the present disclosure. Hereinafter, for convenience of explanation, a direction along a central axis Y1 of the spindle motor 2 illustrated in FIG. 1 is referred to as the axial direction. A side in the axial direction indicated by the arrow "a" is referred to as the upper side, and a side indicated by the arrow "b" is referred to the lower side. Likewise, a side in the longitudinal direction of the base member 11 illustrated in FIG. 1 indicated by the arrow "c" is referred to as the right side, and a side indicated by the arrow "d" is referred to as the left side. Further, a side in a lateral direction of the base member 11 illustrated in FIG. 2 indicated by the arrow "e" is referred to as the front side, and a side indicated by the arrow "f" is referred to as the back side. However, when simply referring to a direction orthogonal to the axial direction, it is referred to as the radial direction. In the following description, the terms "up", "down", "left", "right", "front", and "back", merely indicate the positional relationship and direction in the drawings, and do not indicate the positional relationship and direction when the members are incorporated in an actual hard disk drive device.

The spindle motor 2 for the hard disk drive device 1 according to the embodiment of the present disclosure includes a rotor part 30 serving as a rotating part that rotates about the central axis Y1 extending in the axial direction, a base member 11 that extends in the radial direction orthogonal to the axial direction, a connector 40 to which a component disposed on the inner surface 11a side of the base member 11 is electrically connected, and a connector accommodating recess 50. The base member 11 includes an inner surface 11a and an outer surface 11b, and supports the rotor part 30 on an inner surface 11a side. The connector accommodating recess 50 is formed on the outer surface 11b of the base member 11 to accommodate the connector 40. The connector accommodating recess 50 is recessed toward the inner surface 11a side of the base member 11 and includes a bottom surface 51 extending in the radial direction and an annular wall surface 52 extending in the axial direction from the outer periphery of the bottom surface 51 toward the outer surface 11b. The bottom surface 51 is provided with a through-hole 53 that passes through the base member 11 in the axial direction.

The bottom surface 51 of the connector accommodating recess 50 includes a first annular surface 55 that extends from a peripheral edge 53a of the through-hole 53 toward the annular wall surface 52, and a second annular surface 57 that surrounds the first annular surface 55. The first annular surface 55 is recessed with respect to the second annular surface 57. Accordingly, while the connector 40 contacts the second annular surface 57, a gap G is formed between the connector 40 and the first annular surface 55. The gap G is sealed by filling the gap G with an adhesive AD. When viewed along the axial direction, an interface of the cured adhesive AD extends in such a manner that the interface of the cured adhesive AD protrudes from the inner peripheral surface 53b of the through-hole 53 over the entire circumference, i.e. the entire peripheral edge 53a of the through-hole 53. On the other hand, the adhesive AD is not present in a gap between a connector outer peripheral surface 41 of the connector 40 and the annular wall surface 52 of the connector accommodating recess 50. Hereinafter, the configuration of the hard disk drive device 1 will be described in detail.

As illustrated in FIG. 1, in the hard disk drive device 1, a cover 3 is joined to the upper side of the base member 11 that accommodates components of the spindle motor 2 for sealing the inside of the base member 11 and creating a clean internal space S with an extremely small amount of dust, dirt, or the like. The base member 11 and the cover 3 are hermetically sealed by a sealing member such as an elastomer, an adhesive, welding, or the like, thereby forming a housing for the hard disk drive device 1.

The internal space S formed by the base member 11 and the cover 3 is filled with a low-density gas having a density lower than that of air. Examples of the low-density gas include helium, nitrogen, and a gas mixture of helium and nitrogen. The spindle motor 2 is, for example, attached with eight hard disks 4. However, in FIG. 1, the illustration of some of the hard disks is omitted. The use of a gas with a density lower than that of air provides reductions of resistance applied to the hard disk 4, vibration of the hard disks 4 during rotation and power consumption of the spindle motor 2.

The hard disks 4 are attached coaxially with the central axis Y1 of the spindle motor 2. The hard disks 4 are fixed to the spindle motor 2 by fixing a clamp member with mounting screws screwed into screw holes provided on the upper side of a rotor member 31 of the spindle motor 2. Thus, the hard disks 4 rotate integrally with the spindle motor 2. According to the embodiment of the present disclosure, eight hard disks 4 are attached to the spindle motor 2. However, the number of hard disks 4 is not limited to eight.

Further, the hard disk drive device 1 includes a head part 5 including a magnetic head that executes writing and reading of information on the hard disk 4, an arm 6 that supports the head part 5, and a head actuator mechanism 7 that moves the head part 5 and the arm 6 to predetermined positions. The head actuator mechanism 7 is fixed to a predetermined position on the inner surface 11a of the base member 11, and the arm 6 is swingably supported by the head actuator mechanism 7. The head part 5 is disposed such that, for example, each of the hard disks 4 is sandwiched to perform writing and reading of information on both sides of each hard disk 4.

The connector accommodating recess 50 is formed at a predetermined position of the base member 11. The connector 40 for connecting an external control board (not illustrated) is accommodated in the connector accommodating recess 50. The connector 40 and a connection portion 8 of the head actuator mechanism 7, which is a component disposed on the inner surface 11a side of the base member 11, are electrically connected via the through-hole 53 in the connector accommodating recess 50. Specific configurations of the connector 40 and the connector accommodating recess 50 will be described below.

The control information of the head actuator mechanism 7 is transmitted to the head actuator mechanism 7 from the control board through the connector 40 and the connection portion 8 of the head actuator mechanism 7, and as a result the arm 6 swings. Further, information read out from each hard disk 4 by the head part 5 is transmitted to the control board through the connection portion 8 of the head actuator mechanism 7 and the connector 40. Reversely, information to be written on each hard disk 4 is transmitted from the control board to the head part 5 through the connector 40 and the connection portion 8 of the head actuator mechanism 7.

The spindle motor 2 includes a stator part 10, a fluid dynamic pressure bearing 20, and a rotor part 30. The stator part 10 includes the base member 11 and a stator core 12 that is fixed to the base member 11.

The base member 11 is formed of, for example, an aluminum alloy, and includes the inner surface 11a, which is the upper (inner) surface where the stator core 12 is fixed, and the outer surface 11b, which is the lower (outer) surface axially opposite to the inner surface 11a. The base member 11 defines the internal space S of the hard disk drive device 1 with the cover 3, which covers the base member 11.

In the base member 11, a shaft insertion hole 11c through which a lower end portion of a shaft member 21 is inserted and fixed, and a circumferential wall part 11d that is coaxial with the shaft insertion hole 11c are formed. Further, the stator core 12 is fixed to the outer peripheral surface of the circumferential wall part 11d, and coils 13 are wound around the stator core 12.

The lead wire 14 is drawn out from the coil 13. The lead wire 14 is connected to a flexible printed circuit board (FPC) 15, which is attached to the outer surface 11b of the base member 11, by soldering. Control signal of the spindle motor 2 is supplied to the coil 13 through the lead wire 14 from an output end of the flexible printed circuit board 15.

The fluid dynamic pressure bearing 20 includes the shaft member 21 inserted to an upper conical bearing member 22 and a lower conical bearing member 23. The upper conical bearing member 22 and the lower conical bearing member 23 are fixed to the shaft member 21 spacing apart from each other in the axial direction. The shaft member 21 is disposed coaxially with the central axis Y1. A screw hole extending axially is formed from an upper end surface of the shaft member 21. A fixation screw is screwed into this screw hole, thereby fixing the cover 3 to the shaft member 21.

The lower end portion of the shaft member 21 is inserted into the shaft insertion hole 11c, which is formed in the base member 11 coaxial with the central axis Y1. The shaft member 21 is fixed by press fitting or by bonding and press fitting. Thus, the shaft member 21 is also coaxial with the central axis Y1. Further, the shaft member 21 is inserted into a shaft hole 31a, which is formed in the rotor member 31 of the rotor part 30. As a result, the rotor part 30 can rotate about the central axis Y1 through the fluid dynamic pressure bearing 20.

The rotor part 30 includes the rotor member 31, a yoke 32, a rotor magnet 33, and an end cap 34. The rotor member 31 is formed in a substantially cup shape. Further, a yoke attaching portion 31c and the shaft hole 31a, to which the shaft member 21 is inserted, are formed in the rotor member 31. The rotor magnet 33 is fixed to the yoke attaching portion 31c via the yoke 32. The rotor magnet 33 is formed of a permanent magnet and is disposed facing the stator core 12.

The rotor member 31 includes upper and lower conical inner surfaces 31b respectively at the upper end portion and the lower end portion of the shaft hole 31a. The upper and lower conical inner surfaces 31b face respectively an upper conical outer surface 22a of the upper conical bearing member 22 and a lower conical outer surface 23a of the lower conical bearing member 23 via minute gaps. The inner diameter of the conical inner surface 31b that faces the upper conical outer surface 22a increases toward the upper side of the shaft hole 31a of the rotor member 31. The inner diameter of the conical inner surface 31b that faces the lower conical outer surface 23a increases toward the lower side of the shaft hole 31a of the rotor member 31. The minute gap between the conical inner surface 31b and the upper conical outer surface 22a and the minute gap between the conical inner surface 31b and the lower conical outer surface 23a are filled with lubricant oil (not illustrated).

Each of the upper and lower conical inner surfaces 31b includes a dynamic pressure groove portion (not illustrated) where dynamic pressure grooves are formed by electrochemical machining. When the rotor part 30 is rotated, the upper and lower dynamic pressure groove portions generate a dynamic pressure in the lubricant oil filling the minute gaps between the upper and lower conical inner surfaces 31b and the upper and lower conical outer surfaces 22a, 23a by the action of the dynamic pressure groove, thereby supporting the rotor part 30 in a non-contact manner. The dynamic pressure groove may be formed on each of the upper conical outer surface 22a and the lower conical outer surface 23a instead of the upper and lower conical inner surfaces 31b.

A taper seal portion having a gap width that increases toward the outside is formed continuous to an upper end of the minute gap between the upper dynamic pressure groove portion and the upper conical outer surface 22a. The meniscus of the lubricant oil is located in the taper seal portion. Also, at a lower end of the minute gap between the lower dynamic pressure groove portion and the lower conical outer surface 23a, a taper seal portion similar to that described above is formed and the meniscus of the lubricant oil is located in the taper seal portion. A capillary force acting in the taper seal portions prevents leakage of the lubricant oil.

Further, the rotor member 31 is provided with the end cap 34. The end cap 34 is a member for covering the opening in the taper seal portion to prevent leakage of the lubricant oil. The end cap 34 is fixed to the rotor member 31 by bonding or by bonding and press fitting. A small gap is formed between the end cap 34 and the shaft member 21 so as to prevent the end cap 34 from disturbing the rotation of the rotor member 31.

The rotor magnet 33 fixed to the rotor part 30 and the stator core 12 fixed to the base member 11 face each other through the small gap. When drive currents having different phases flow through the plurality of coils 13 wound around the stator core 12, a rotating magnetic field is generated and a rotating torque is generated on the rotor magnet 33. This allows the rotor part 30 to rotate around the stator part 10 via the fluid dynamic pressure bearing 20.

When the rotor part 30 is rotated via the fluid dynamic pressure bearing 20, a dynamic pressure causing the separation of the upper conical inner surface 31b of the rotor part 30 and the upper conical outer surface 22a, and the separation of the lower conical inner surfaces 31b of the rotor part 30 and the lower conical outer surface 23a is generated by the dynamic pressure grooves provided in the dynamic pressure groove portions. With this configuration, the conical inner surfaces 31b and each of the upper conical outer surface 22a and the lower conical outer surface 23a are brought into a non-contact state. Further, when the conical inner surfaces 31b and each of the conical outer surfaces 22a and 23a is brought into a non-contact state, the rotor part 30 rotates around the stator part 10 in a non-contact state.

Figure 2:
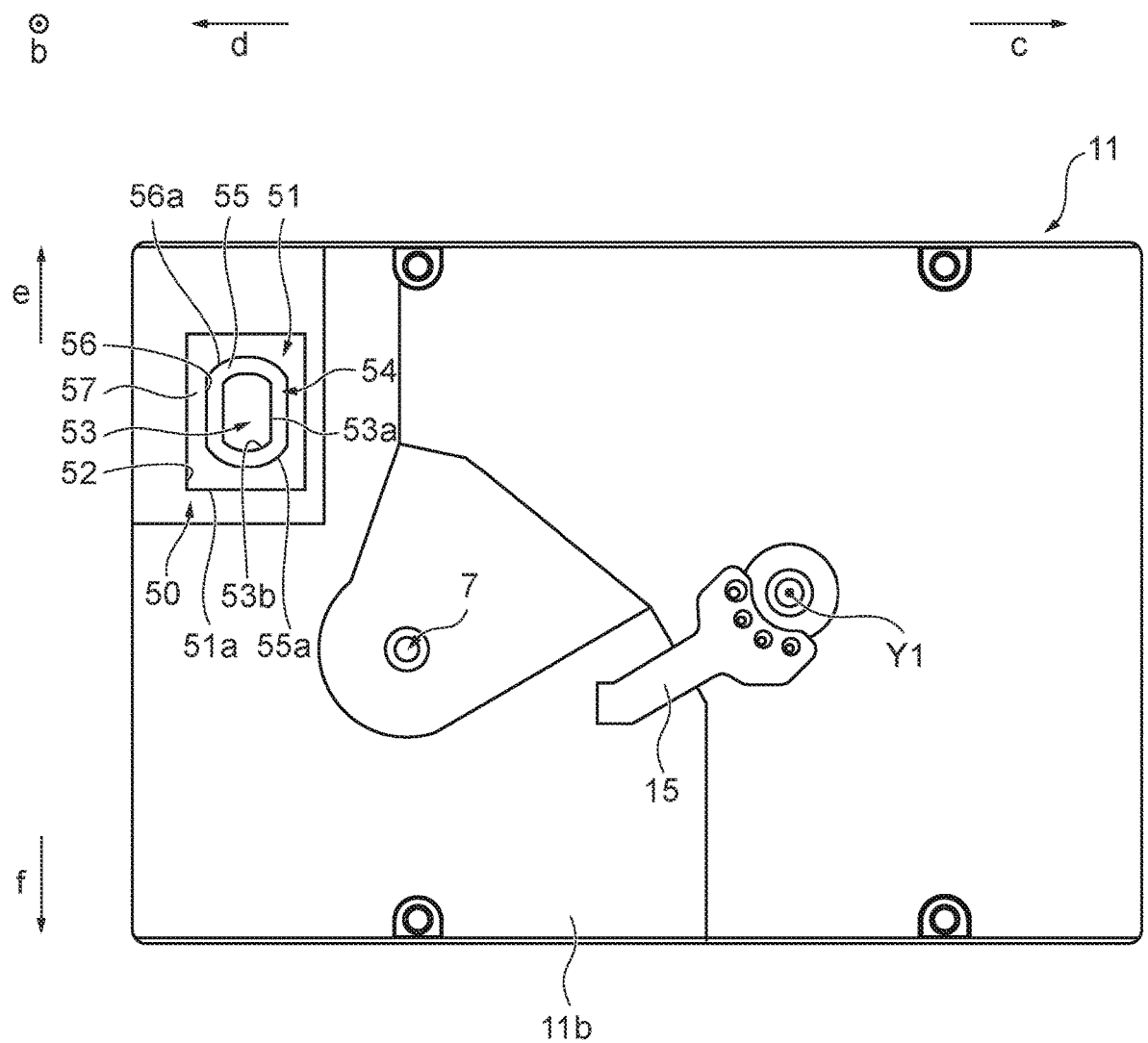
FIG. 2 is a plan view of a base member of the hard disk drive device illustrated in FIG. 1 as viewed from outside.
Figure 3:
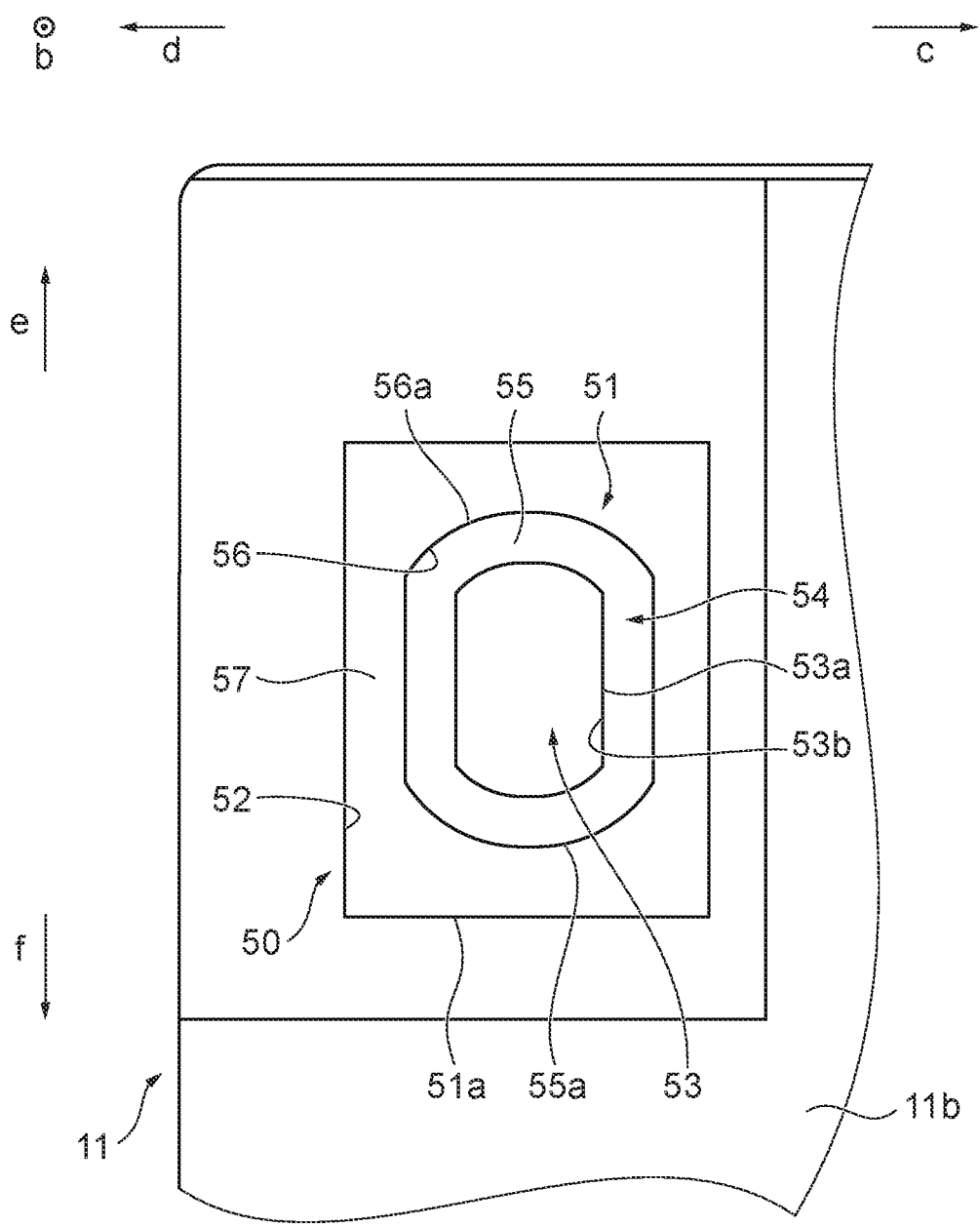
FIG. 3 is a partially enlarged plan view of a connector accommodating recess of the base member illustrated in FIG. 2.
Figure 4:
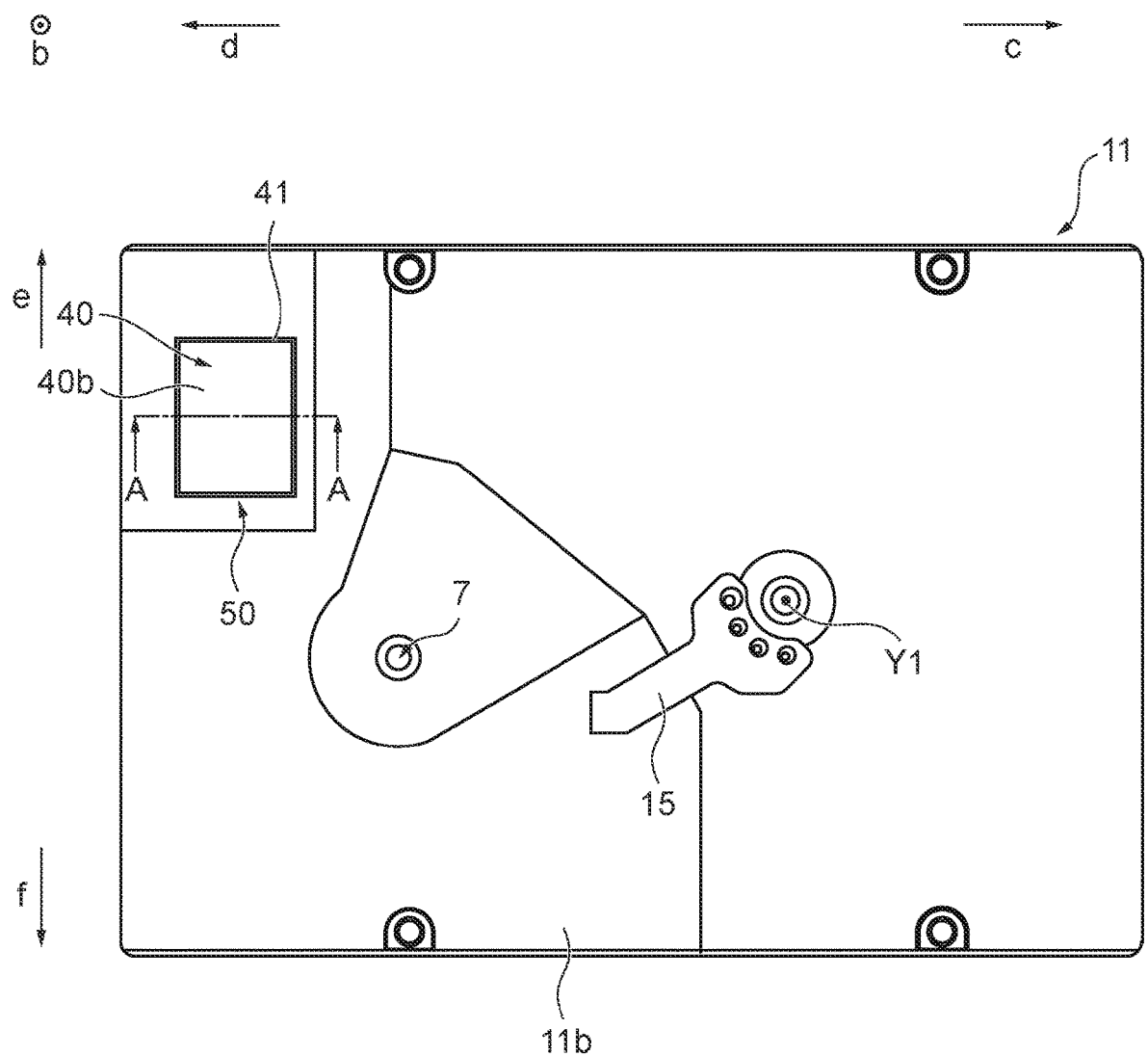
FIG. 4 is a plan view of a configuration where a connector is accommodated in the base member illustrated in FIG. 2 as viewed from outside.
Figure 5:
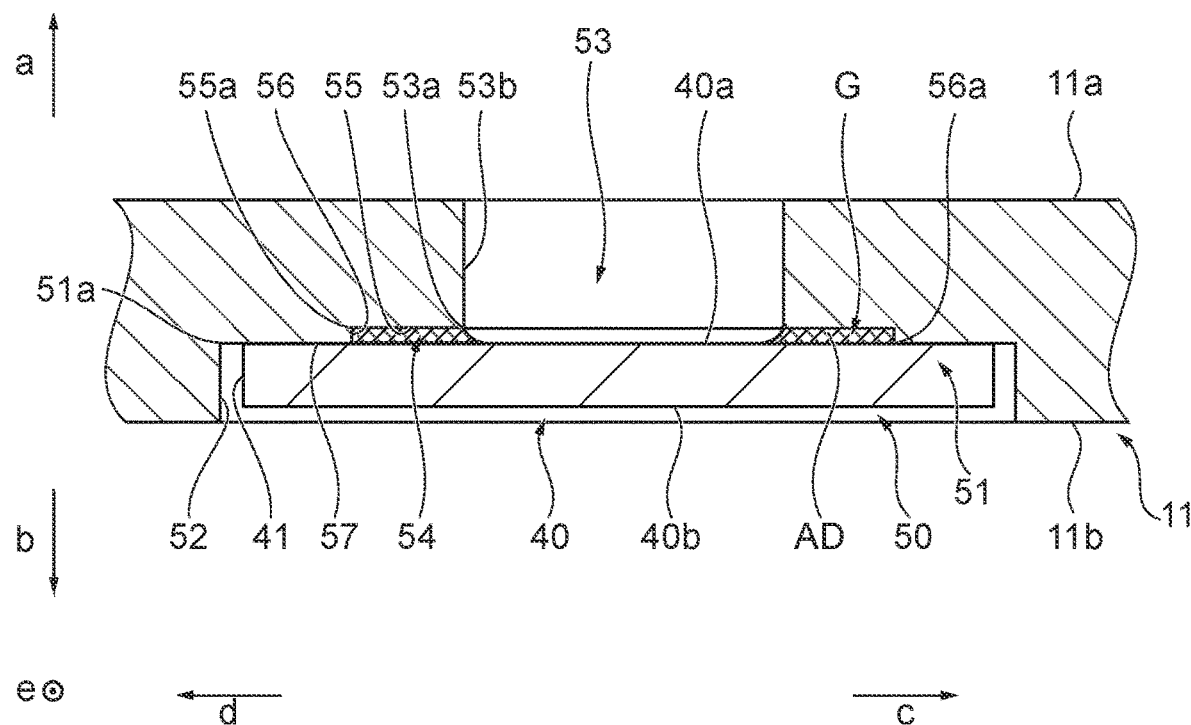
FIG. 5 is a sectional view taken along a line A-A in FIG. 4.

FIG. 2 is a plan view of the base member 11 of the hard disk drive device 1 illustrated in FIG. 1 as viewed from the outside (lower side) of the hard disk drive device 1. FIG. 3 is a partially enlarged plan view of the connector accommodating recess 50 of the base member 11 illustrated in FIG. 2. FIG. 4 is a plan view of a configuration in which the connector 40 is attached in the base member 11 illustrated in FIG. 2 as viewed from the outside. FIG. 5 is a sectional view taken along a line A-A in FIG. 4.

As illustrated in FIGS. 2 and 3, the connector accommodating recess 50 is provided on the outer surface (lower surface) 11b of the base member 11, and is recessed toward the inner surface (upper surface) 11a. The connector accommodating recess 50 includes the bottom surface 51 and the annular wall surface 52 that is an annular surface that surrounds the bottom surface 51 and extends downward from a peripheral edge 51a to the outer surface 11b. In the bottom surface 51, the through-hole 53 that passes through the base member 11 in the axial direction is formed. The bottom surface 51 includes the first annular surface 55 that extends in the radial direction from the peripheral edge 53a of the through-hole 53, and the second annular surface 57 that surrounds the first annular surface 55 and extends to the annular wall surface 52. As illustrated in FIG. 5, the first annular surface 55 is located on the upper side of the second annular surface 57, and thus the first annular surface 55 is recessed with respect to the second annular surface 57, thereby forming a step portion 54.

The connector accommodating recess 50 is formed on the left side and the front side in the outer surface 11b of the base member 11. The connector accommodating recess 50 is formed in a shape corresponding to the connector 40, and is formed, for example, in a rectangular shape in a plan view. The bottom surface 51 of the connector accommodating recess 50 extends in a rectangular shape in a plan view, and the peripheral edge 51a on the outer periphery side of the bottom surface 51 is connected to an upper end of the annular wall surface 52 of the connector accommodating recess 50.

The annular wall surface 52 of the connector accommodating recess 50 extends in a rectangular tubular shape on the lower side along the axial direction from the peripheral edge 51a on the outer periphery side of the bottom surface 51, and a lower end of the annular wall surface 52 is connected to the outer surface 11b of the base member 11.

The through-hole 53 passes through the base member 11 in the axial direction, and is formed, for example, in a central portion of the bottom surface 51. The through-hole 53 of the connector accommodating recess 50 is formed corresponding to the connection portion 8 of the head actuator mechanism 7. For example, the dimensions of the through-hole 53 in the lateral direction of the base member 11 are greater than the dimensions of the through-hole 53 in the longitudinal direction of the base member 11. The through-hole 53 is a connector window for inserting the connection portion 8 of the head actuator mechanism 7 and connecting the connection portion 8 to the connector 40.

Further, in the bottom surface 51, the step portion 54 is formed surrounding the lower peripheral edge 53a of the through-hole 53. In the step portion 54, the first annular surface 55 extends in such a manner that the first annular surface 55 spreads in the radial direction from the lower peripheral edge 53a of the through-hole 53. The first annular surface 55 is a part of the bottom surface 51 of the connector accommodating recess 50, and extends annularly whose inner peripheral edge is the peripheral edge 53a of the through-hole 53 in the connector accommodating recess 50. The dimension of the first annular surface 55 in the lateral direction of the base member 11 are greater than the dimension of the first annular surface 55 in the longitudinal direction of the base member 11.

Further, the step portion 54 includes a step portion annular wall surface 56 that is an annular surface extending downward along the axial direction from an outer peripheral edge 55a of the first annular surface 55. The length of the step portion annular wall surface 56 in the axial direction is shorter than the length of the annular wall surface 52 in the axial direction (FIG. 5). A lower peripheral edge 56a of the step portion annular wall surface 56 is connected to the second annular surface 57 that defines a part of the bottom surface 51 of the connector accommodating recess 50.

The second annular surface 57 extends in such a manner that the second annular surface 57 spreads in the radial direction from the lower peripheral edge 56a of the step portion annular wall surface 56. The second annular surface 57 extends, for example, in a rectangular annular shape with the lower peripheral edge 56a of the step portion annular wall surface 56 being an inner peripheral edge and with the peripheral edge 51a on the outer periphery side of the bottom surface 51 of the connector accommodating recess 50 being an outer peripheral edge. The dimension of the second annular surface 57 in the lateral direction of the base member 11 is longer than the dimension of the second annular surface 57 in the longitudinal direction of the base member 11.

As illustrated in FIG. 5, the connector 40 contacts the second annular surface 57 whereas the gap G is formed between the connector 40 and the first annular surface 55. The gap G is filled with the adhesive AD. The interface of the adhesive AD is exposed by protruding in the radial direction from the inner peripheral surface 53b of the through-hole 53 over the entire length of the peripheral edge 53a of the through-hole 53. However, the adhesive AD is not present in the gap between the connector outer peripheral surface 41 and the annular wall surface 52 of the connector accommodating recess 50.

The connector 40 is formed, for example, in a rectangular shape in a plan view. As illustrated in FIG. 5, the connector 40 includes a connector inner surface 40a that is an upper (inner side) surface, a connector outer surface 40b that is a lower (outer side) surface opposite to the connector inner surface 40a, and the connector outer peripheral surface 41 that connects the connector inner surface 40a and the connector outer surface 40b to each other. As illustrated in FIG. 1, the connector 40 is electrically connected to the connection portion 8 of the head actuator mechanism 7 by respectively connecting a plurality of terminals (not illustrated) of the connector inner surface 40a to a plurality of terminals of the connection portion 8 of the head actuator mechanism 7.

The longitudinal and the lateral lengths of the connector 40 are respectively shorter than the longitudinal and the lateral lengths of the connector accommodating recess 50. Further, the axial length of the connector 40 is shorter than the axial length of the annular wall surface 52 of the connector accommodating recess 50. With this configuration, the connector 40 can be accommodated in the connector accommodating recess 50.

As illustrated in FIG. 5, in the connector 40, a part of the connector inner surface 40a next to the connector outer peripheral surface 41 contacts the second annular surface 57, and a part of the connector inner surface 40a that is closer to the center than the contacting part faces the first annular surface 55. Further, a central portion of the connector inner surface 40a faces the through-hole 53. The gap G is formed in the axial direction around the entire periphery of the through-hole 53 between the first annular surface 55 and the part of the connector inner surface 40a that is closer to the center of the connector inner surface 40a. Further, the connector 40 is accommodated in the central portion of the connector accommodating recess 50, and the connector outer peripheral surface 41 does not contact the annular wall surface 52 of the connector accommodating recess 50.

The adhesive AD fills the gap G between the first annular surface 55 and the connector inner surface 40a over the whole periphery of the first annular surface 55. Further, the interface of the adhesive AD extends such that the interface distances from an imaginary surface extended from the inner peripheral surface 53b of the through-hole 53, toward the inside of the connector accommodating recess 50 as the interface approaches to the connector inner surface 40a from the first annular surface 55 in the axial direction. In other words, when the connector 40 is viewed along the axial direction from a position on the inner surface 11a side of the base member 11, the interface of the adhesive AD that is exposed protruding from the inner peripheral surface 53b of the through-hole 53 along the connector inner surface 40a is visible. Thus, since the formation of the interface of the adhesive AD over the entire periphery of the through-hole 53 can be verified by visual observation, it is possible to easily confirm that the gap between the connector accommodating recess 50 and the connector 40 is reliably sealed.

Further, the adhesive AD is not present in the gap between the connector outer peripheral surface 41 and the annular wall surface 52 of the connector accommodating recess 50, which is the gap leading to the outer surface 11b of the base member 11. In other words, since the gap G and the step portion annular wall surface 56 are provided between the connector inner surface 40a and the bottom surface 51 of the connector accommodating recess 50, the adhesive AD is blocked by the step portion annular wall surface 56 and the adhesive AD is retained in the gap G when the gap between the connector 40 and the connector accommodating recess 50 is sealed. Therefore, it is also easy to adjust the coating amount of the adhesive AD to prevent leakage of the adhesive AD into the gap between the connector outer peripheral surface 41 and the annular wall surface 52 of the connector accommodating recess 50. Consequently, it is possible to prevent the uncured adhesive AD from adhering to the outer side of the base member 11 during handling in a manufacturing process when the connector 40 is bonded to the connector accommodating recess 50. Further, an adhesive layer with a thickness corresponding to the gap width of the gap G is formed and thus a satisfactory sealing performance can be obtained. The thickness of the adhesive layer for obtaining the satisfactory sealing performance can be easily adjusted by changing the axial length of the step portion annular wall surface 56.

The adhesive AD is required to be easily cured in the gap G in which air is blocked and to have low outgas property. Accordingly, it is preferable to use a thermosetting epoxy-based adhesive as the adhesive AD. However, an acrylic adhesive that is anaerobic and ultraviolet curable may also be used as the adhesive AD.

As described above, in the hard disk drive device 1 according to the embodiment of the present disclosure, the gap G is formed between the connector 40 and the first annular surface 55, and the gap G is sealed with the adhesive AD. The interface of the adhesive AD extends such that the interface protrudes in the radial direction from the inner peripheral surface 53b over the entire periphery of the through-hole 53, and the adhesive AD is not present in the gap between the connector outer peripheral surface 41 and the annular wall surface 52 of the connector accommodating recess 50.

Since the interface of the adhesive AD is formed over the whole periphery of the through-hole 53, the sealing performance between the connector accommodating recess 50 and the connector 40 can be improved. Further, since the interface of the adhesive AD can be viewed from the inner surface 11a side of the base member 11, it can easily confirm that the improved sealing performance between the connector accommodating recess 50 and the connector 40 is obtained. Further, when the connector 40 is accommodated in the connector accommodating recess 50, the adhesive AD does not spread to the gap between the connector outer peripheral surface 41 and the annular wall surface 52 of the connector accommodating recess 50, thereby preventing the uncured adhesive AD from adhering to the outer side of the base member 11 during handling.

While an embodiment of the present disclosure has been described above, the present disclosure is not limited to the above-described embodiment. A variety of modes included in the concept of the present disclosure and the scope of claims are also included in the present disclosure. Further, the components can be appropriately selected and combined to obtain at least some of the above-described advantageous effects.

Figure 6:
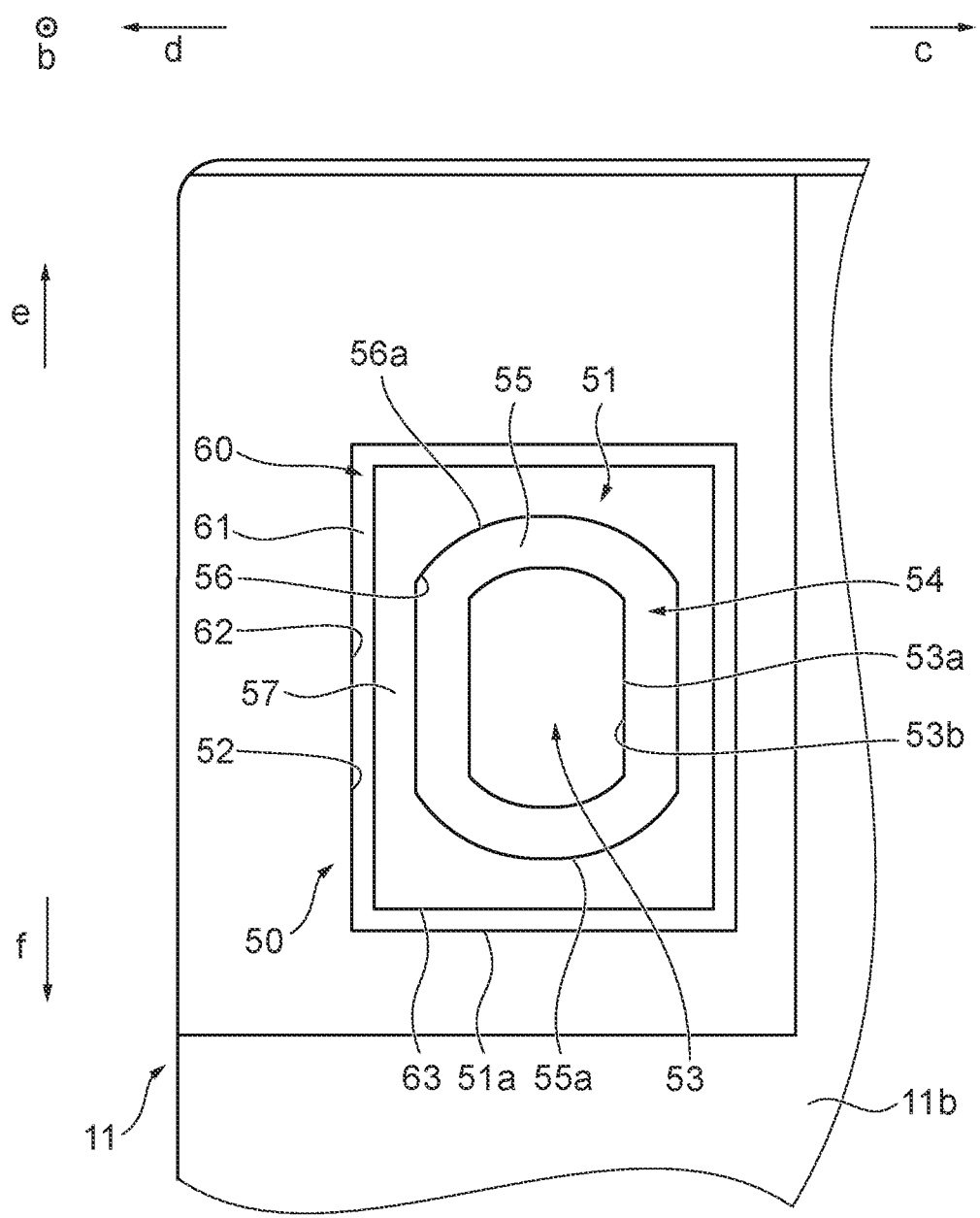
FIG. 6 is a partially enlarged plan view of a connector accommodating recess according to a first modified example of the present disclosure.
Figure 7:
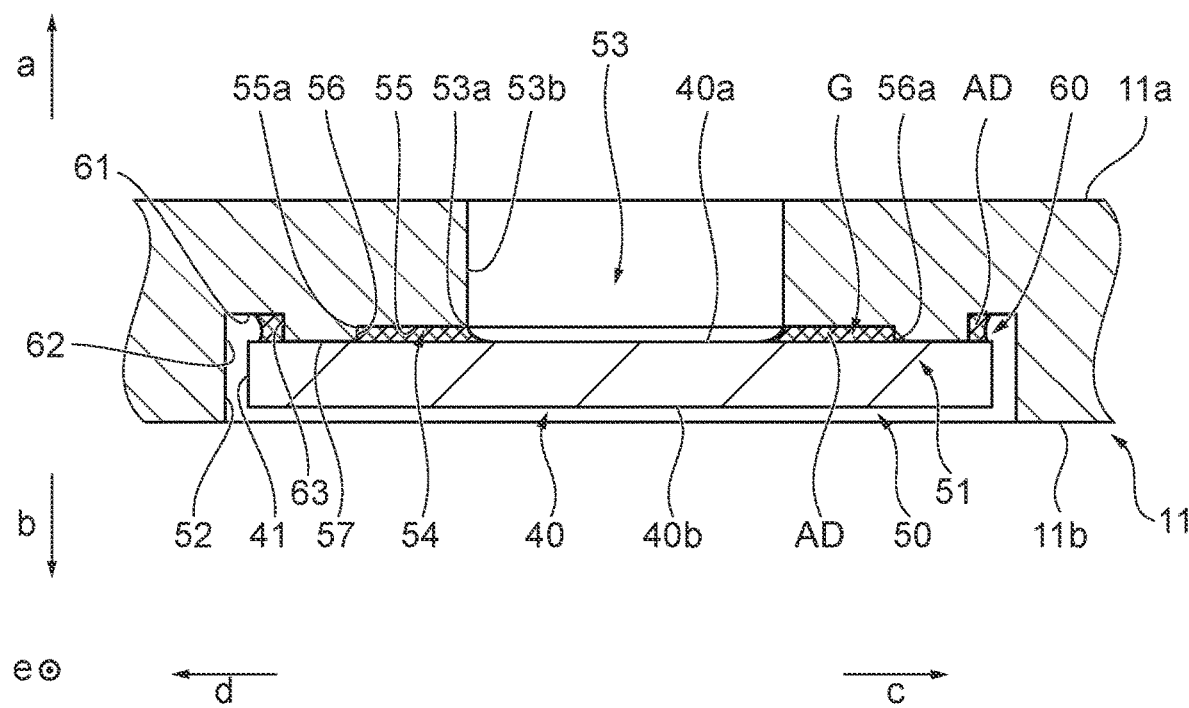
FIG. 7 is a sectional view of the connector accommodating recess illustrated in FIG. 6 and a connector.

For example, as a first modified example of the hard disk drive device 1 according to the embodiment of the present disclosure, as illustrated in FIGS. 6 and 7, an annular groove 60 that is recessed toward the inner side from the outer side of the base member 11 between the annular wall surface 52 and the second annular surface 57 of the connector accommodating recess 50 may be further provided.

In this case, as illustrated in FIG. 7, the annular groove 60 includes an annular groove bottom surface 61, an outer peripheral wall 62 that extends toward the lower side in the axial direction from the peripheral edge on the outer periphery side of the groove bottom surface 61, and an inner peripheral wall 63 that extends toward the lower side in the axial direction from the peripheral edge on the inner periphery side of the groove bottom surface 61. The lower peripheral edge of the inner peripheral wall 63 is connected to the second annular surface 57, and the outer peripheral wall 62 is flush with the annular wall surface 52 of the connector accommodating recess 50. In other words, the outer peripheral wall 62 of the annular groove 60 forms a part of the annular wall surface 52 of the connector accommodating recess 50.

Further, the annular groove 60 has a depth greater than the axial dimension of the gap G. In other words, the axial length of the inner peripheral wall 63 is longer than the axial length of the step portion annular wall surface 56 of the step portion 54. Further, the outer peripheral portion of the connector inner surface 40a faces the groove bottom surface 61 of the annular groove 60.

For this reason, even when the amount of the adhesive AD is excessive, the uncured adhesive AD leaking from the gap G is retained in the annular groove 60, thereby preventing the adhesive AD from spreading to the gap between the connector outer peripheral surface 41 and the annular wall surface 52 of the connector accommodating recess 50. Consequently, it is possible to prevent the uncured adhesive AD from adhering to the outer side of the base member 11 during handling in a manufacturing process.

Figure 8:
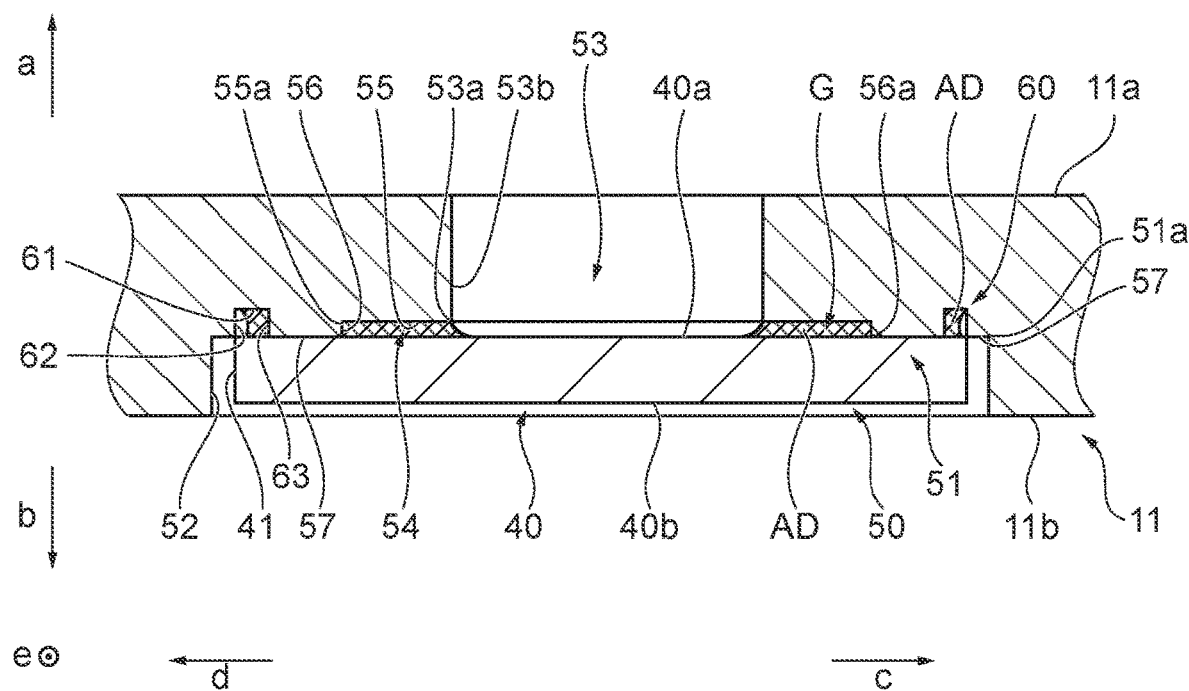
FIG. 8 is a sectional view of a connector accommodating recess according to a second modified example of the present disclosure and a connector.

Further, the present disclosure is not limited to the first modified example. Like in a second modified example illustrated in FIG. 8, the annular groove 60 may be formed in the second annular surface 57 separated from the annular wall surface 52. In this case, the outer peripheral wall 62 of the annular groove 60 is not flush with the annular wall surface 52 of the connector accommodating recess 50. Therefore, the outer peripheral wall 62 is not continuous with the annular wall surface 52 of the connector accommodating recess 50.

Figure 9:
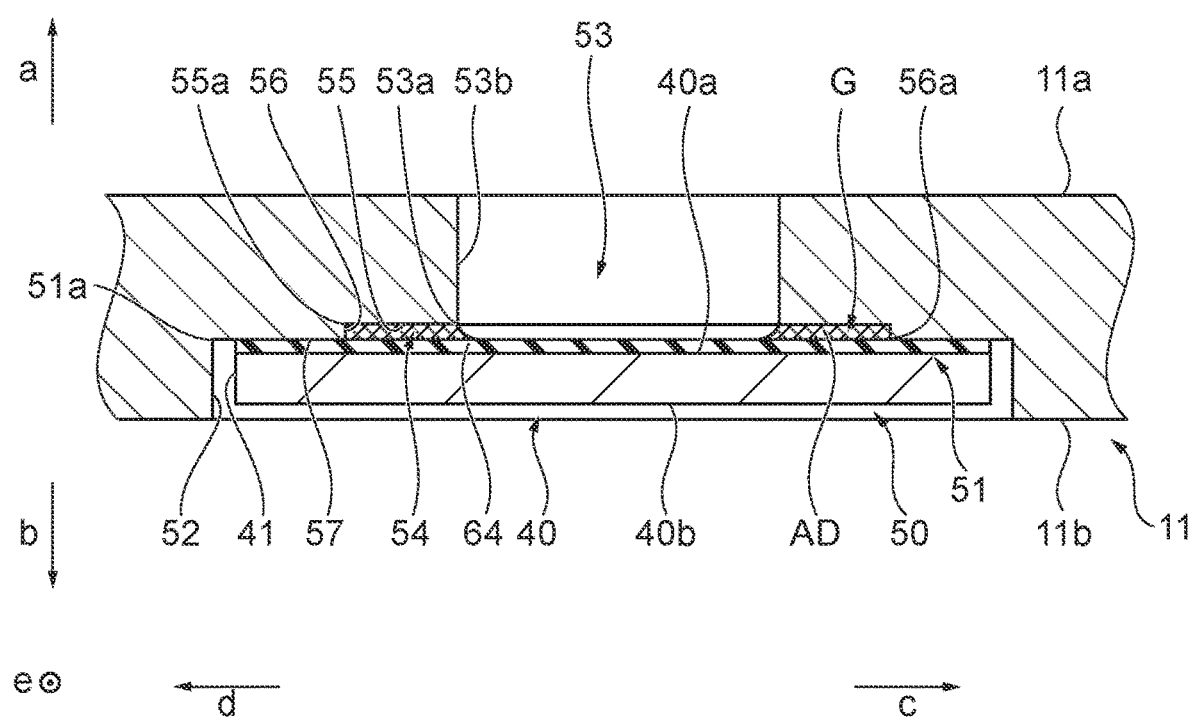
FIG. 9 is a sectional view of a connector accommodating recess according to a third modified example of the present disclosure and a connector.

Further, in a third modified example of the hard disk drive device 1 according to the embodiment of the present disclosure, as illustrated in FIG. 9, a metal coating 64 such as electroless nickel plating may be formed on the connector inner surface 40a. With this configuration, the wettability of the connector inner surface 40a to the adhesive AD can be improved and the interface of the adhesive AD is more easily formed on the connector inner surface 40a at the inside of the imaginary surface extended from the inner peripheral surface 53b. Consequently, the sealing performance between the connector accommodating recess 50 and the connector 40 can be further improved.

What is claimed is:

1. A spindle motor comprising:
a rotating part configured to rotate about a central axis extending in an axial direction;
a base member including an inner surface and an outer surface, the base member extending in a radial direction orthogonal to the axial direction and being configured to support the rotating part on an inner surface side;
a connector to which a component disposed on the inner surface side of the base member is electrically connected; and
a connector accommodating recess formed on the outer surface of the base member,
wherein the connector accommodating recess includes a bottom surface extending in the radial direction, and an annular wall surface extending in the axial direction from an outer periphery of the bottom surface to the outer surface,
a through-hole is formed in the axial direction in the bottom surface,
the bottom surface includes a first annular surface extending toward the annular wall surface from a peripheral edge of the through-hole, and a second annular surface surrounding the first annular surface,
the connector contacts the second annular surface,
a first gap between the connector and the first annular surface is filled with an adhesive, and
an interface of the adhesive, when viewed along the axial direction, extends protruding from an inner peripheral surface of the through-hole over an entire circumference of the through-hole.

2. The spindle motor according to claim 1, wherein the adhesive is not present in a second gap between an outer peripheral surface of the connector and the annular wall surface of the connector accommodating recess.

3. The spindle motor according to claim 1, further comprising an annular groove that is recessed toward the inner surface of the base member and located between the annular wall surface of the connector accommodating recess and the second annular surface or on the second annular surface.

4. The spindle motor according to claim 3, wherein a depth of the annular groove is greater than an axial dimension of the first gap.

5. The spindle motor according to claim 3, wherein an outer peripheral wall surface of the annular groove is flush with the annular wall surface of the connector accommodating recess.

6. The spindle motor according to claim 1, wherein a metal coating is formed on a surface of the connector, the surface being in contact with the second annular surface.

7. A hard disk drive device comprising:
the spindle motor according to claim 1;
a cover member configured to form a sealed inner space with the base member;
a gas with a density lower than a density of air filling the inner space;
a hard disk to be rotated by the motor part; and
a head part configured to at least read information from the hard disk or write information to the hard disk.

8. The spindle motor according to claim 1, wherein the interface of the adhesive is visible when viewed along the axial direction.

9. The spindle motor according to claim 2, wherein the interface of the adhesive is visible when viewed along the axial direction.

10. The spindle motor according to claim 9 further comprising an annular groove that is recessed toward the inner surface of the base member and located between the annular wall surface of the connector accommodating recess and the second annular surface or on the second annular surface.

11. The spindle motor according to claim 10, wherein a depth of the annular groove is greater than an axial dimension of the first gap.

12. The spindle motor according to claim 11, wherein an outer peripheral wall surface of the annular groove is flush with the annular wall surface of the connector accommodating recess.

13. The spindle motor according to claim 3, wherein an outer peripheral wall surface of the annular groove is separated from the annular wall surface of the connector accommodating recess.

14. The spindle motor according to claim 11, wherein an outer peripheral wall surface of the annular groove is separated from the annular wall surface of the connector accommodating recess.

15. The spindle motor according to claim 9, wherein a metal coating is formed on a surface of the connector, the surface being in contact with the second annular surface.

16. The spindle motor according to claim 10, wherein a metal coating is formed on a surface of the connector, the surface being in contact with the second annular surface.

17. A hard disk drive device comprising:
the spindle motor according to claim 9;
a cover member configured to form a sealed inner space with the base member;
a gas with a density lower than a density of air filling the inner space;
a hard disk to be rotated by the motor part; and
a head part configured to at least read information from the hard disk or write information to the hard disk.

18. A hard disk drive device comprising:
the spindle motor according to claim 10;
a cover member configured to form a sealed inner space with the base member;
a gas with a density lower than a density of air filling the inner space;
a hard disk to be rotated by the motor part; and
a head part configured to at least read information from the hard disk or write information to the hard disk.

* * * * *